UNITED STATES PATENT OFFICE.

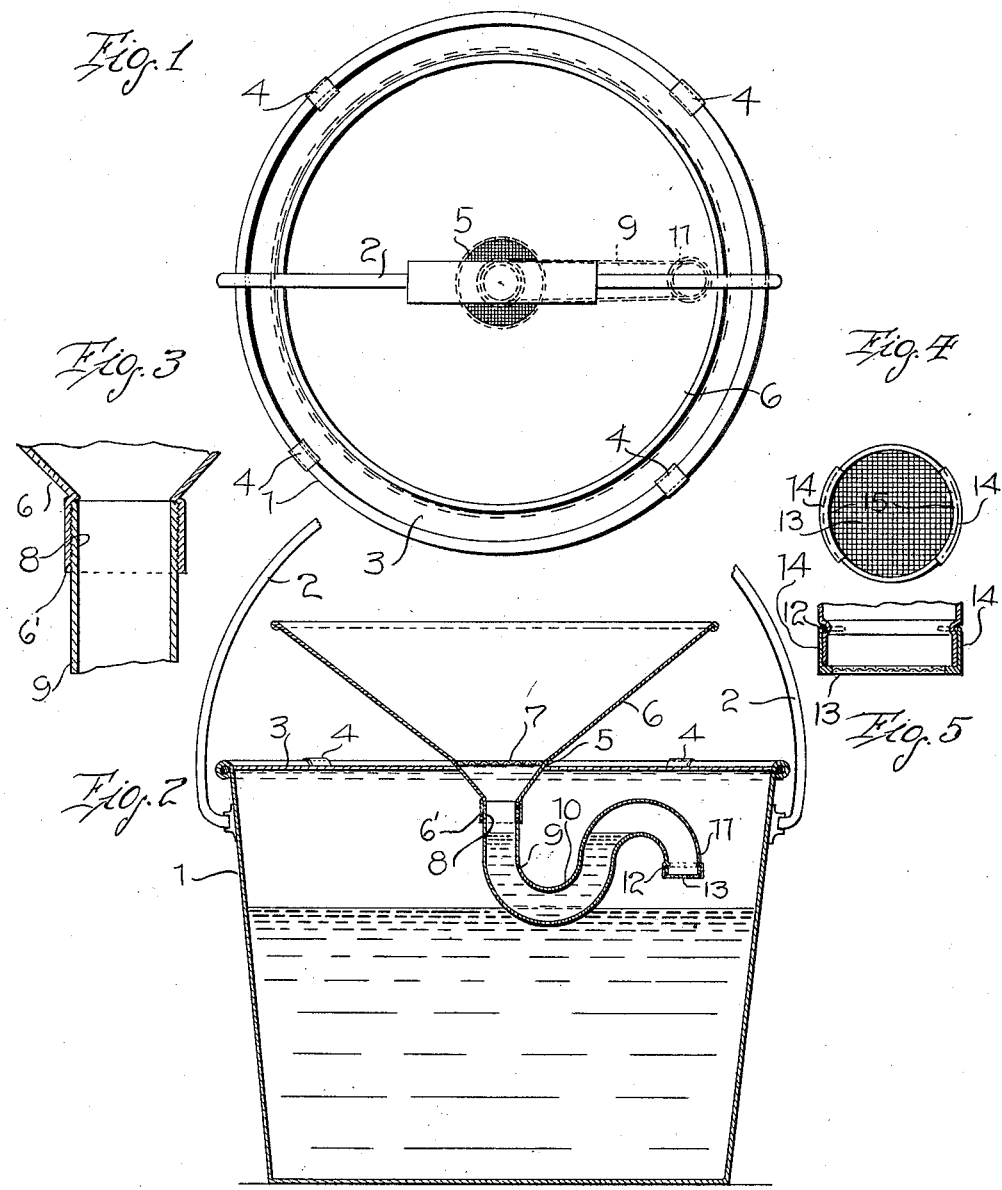

HENRY C. L. CHRISTOPHERSEN, OF OCONTO, WISCONSIN.

MILKING-PAIL.

1,076,348.

Specification of Letters Patent.

Patented Oct. 21, 1913.

Application filed April 5, 1913. Serial No. 759,125.

*To all whom it may concern:*

Be it known that I, HENRY C. L. CHRISTOPHERSEN, a citizen of the United States, residing at Oconto, in the county of Oconto and State of Wisconsin, have invented certain new and useful Improvements in Milking-Pails, of which the following is a specification, reference being had to the accompanying drawings.

This invention relates to improvements in milking pails, and more particularly to straining covers therefor.

An object of this invention is the provision of a milk pail cover having a funnel projecting therethrough, the funnel having a strainer mounted therein and a pipe detachably connected to the lower end thereof, the pipe being bent to form a trap whereby dirt or other foreign matter is prevented from entering the pail.

Another object of this invention is the provision of a milk pail cover which is provided with a central opening, the cover having a funnel secured in the opening, the lower end of the funnel being threaded to receive the threaded end of a curved pipe which is arranged within the pail, the pipe having a strainer detachably mounted upon its free end, whereby the milk is strained before it enters the pail.

With these and other objects in view, my invention consists in certain novel constructions, combinations and arrangements of parts, to be hereinafter more fully described, claimed and illustrated in the accompanying drawing, in which—

Figure 1 is a top plan view of my invention; Fig. 2 is a vertical section thereof; Fig. 3 is a fragmentary section showing the connection between the funnel and the outlet pipe; Fig. 4 is a top plan view of the pipe strainer; and Fig. 5 is a vertical section showing the manner of connecting the pipe strainer and the pipe.

Referring more particularly to the drawing, the numeral 1 designates a pail of any desired construction, to the upper end of which a bail 2 is suitably secured. The cover 3 is secured to the upper edge of the pail by clasps 4, and is provided with a central opening 5 in which a funnel 6 is soldered or otherwise secured near its lower end. The funnel 6 has a straining disk 7 of wire mesh or other suitable material detachably mounted therein near its lower end, and the lower extremity of the funnel projects through the cover and is threaded, as at 6', to receive the threaded end 8 of a pipe 9. The pipe 9 is curved, as at 10 to form a trap, and the free end 11 of the pipe extending downwardly within the pail, and is formed near its extremity with an annular groove 12. A straining disk 13 is provided with a pair of laterally projecting U-shaped spring clamps 14, the medial portions 15 of which being curved inwardly to engage the groove 12 whereby the strainer may be detachably secured to the free end of the pipe.

In the practical use of my device, the cover is secured to the milk pail by the clasps 4 and the milk passing through the strainer 7 is freed from large particles of foreign matter which may be in the milk, and should any foreign particles pass through the strainer 7, they will be prevented from passing into the pail by the strainer 13 and maintained in the curved portion 10 of the pipe. It will be seen that the pipe is readily detachable from the lower end of the funnel, whereby it may be cleaned when desired. By providing the strainer 13 with the spring clamps 14, the strainer may be quickly detached from the pipe so that a cleaning cloth may be passed into the end 11 of the pipe and so that the strainer itself may be cleaned. From the above description taken in connection with the accompanying drawing, it will be evident that the milk will be completely strained of all foreign matter before it may enter the body of the pail. By curving the pipe 9 to form a trap, all foul odors from the barn yard, are prevented from coming into contact with the milk contained within the pail.

Having thus fully described my invention what I desire to claim and secure by Letters Patent is:

1. A cover for milk pails comprising a plate having a funnel projecting therethrough, a pipe detachably connected to the lower end of said funnel, said pipe being formed near its free end with an annular groove, and a strainer having spring clamps adapted for engagement in said groove, as and for the purpose described.

2. A cover for milk pails or the like, comprising a plate having a funnel projecting therethrough, a strainer mounted in said funnel, and a pipe detachably connected with the lower end of said funnel, said pipe being curved to form a trap, as and for the purpose described.

3. A cover for milk pails or the like comprising a plate having a funnel projecting therethrough, a pipe detachably connected to the lower end of said funnel, said pipe being curved to form a trap, and a strainer detachably mounted upon the free end of said pipe, as and for the purpose described.

In testimony whereof I hereunto affix my signature in the presence of two witnesses.

HENRY C. L. CHRISTOPHERSEN.

Witnesses:
H. J. SOLWAY,
A. N. MEHLBERG.

Copies of this patent may be obtained for five cents each, by addressing the "Commissioner of Patents, Washington, D. C."